United States Patent
Albrow et al.

[11] Patent Number: 6,026,083
[45] Date of Patent: Feb. 15, 2000

[54] TRANSMISSION OF CONTROL MESSAGES IN DIGITAL TELEPHONY

[75] Inventors: Richard John Albrow; Simon Alexander Black; Leigh Carter; Rupert Leslie Alexander Goodings, all of Cambridge; Paul Maxwell Martin, Suffolk; Neil Philip Piercy, Cambridge, all of United Kingdom

[73] Assignee: Ionica International Limited, Cambridge, United Kingdom

[21] Appl. No.: 08/809,133

[22] PCT Filed: Sep. 8, 1995

[86] PCT No.: PCT/GB95/02131

§ 371 Date: May 28, 1997

§ 102(e) Date: May 28, 1997

[87] PCT Pub. No.: WO96/08935

PCT Pub. Date: Mar. 21, 1996

[30] Foreign Application Priority Data

Sep. 16, 1994 [GB] United Kingdom .................... 9418772

[51] Int. Cl.[7] .................................................. H04B 7/212
[52] U.S. Cl. ............................................ 370/347; 370/444
[58] Field of Search ........................... 370/347, 442, 370/444, 350, 445, 395, 326, 336, 337, 345, 329, 321, 443, 447, 294, 28 Q, 310, 522; 340/825.5; 455/33.1

[56] References Cited

U.S. PATENT DOCUMENTS

| | | | |
|---|---|---|---|
| 5,175,867 | 12/1992 | Wejke et al. | 455/33.1 |
| 5,237,570 | 8/1993 | Smolinske et al. | 370/95.1 |
| 5,297,142 | 3/1994 | Paggeot et al. | 370/85.6 |
| 5,353,287 | 10/1994 | Kuddes et al. | 370/85.2 |
| 5,371,780 | 12/1994 | Amitay | 379/58 |
| 5,373,506 | 12/1994 | Tayloe et al. | 370/95.1 |
| 5,412,650 | 5/1995 | Davies | 370/82 |
| 5,513,183 | 4/1996 | Kay et al. | 370/95.3 |
| 5,515,379 | 5/1996 | Crisler et al. | 370/95.3 |
| 5,521,925 | 5/1996 | Merakos et al. | 370/95.3 |

FOREIGN PATENT DOCUMENTS

| | | | |
|---|---|---|---|
| 0 285 522 | 5/1988 | European Pat. Off. | 88/40 |
| 0 545 533 | 6/1993 | European Pat. Off. | H04Q 7/04 |

*Primary Examiner*—Ajit Patel
*Assistant Examiner*—Brian Nguyen
*Attorney, Agent, or Firm*—Fish & Richardson P.C.

[57] ABSTRACT

In a communications network involving transmission of data packets, control messages between nodes are assigned priorities dependent on message type. The allocated of messages to TDM/TDMA time slots is dependent on the assignment priorities.

13 Claims, 2 Drawing Sheets

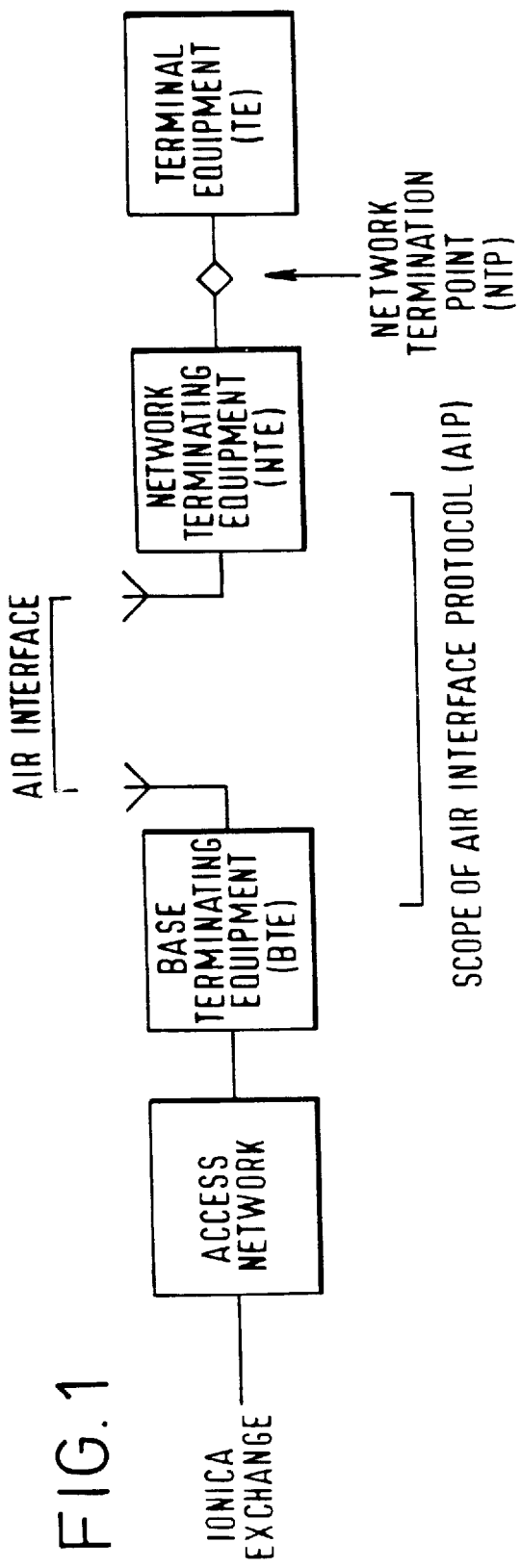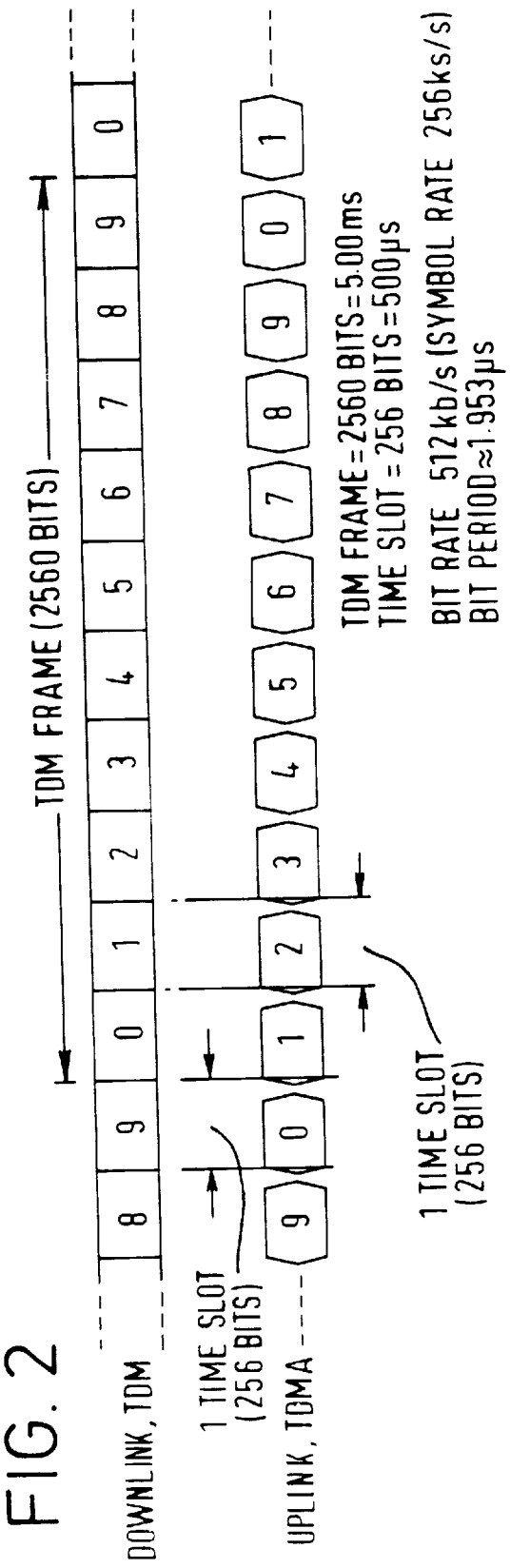

TRANSMISSION OF CONTROL MESSAGES IN DIGITAL TELEPHONY

The invention relates to transmitting control messages in time slots within fixed length time frames, in particular, in time division multiplexing/time division multiple access (TDM/TDMA) digital telephony.

The present invention is defined in the claims to which reference should now be made.

The present invention relates to a method of transmitting control messages between nodes in a TDM/TDMA network in which control messages are assigned priorities dependent on message type, and the allocation of messages to TDM/TDMA time slots is dependent on the assigned priorities.

Each message has an assigned priority which can be designated by a value. For some messages, the associated priority value is incremented for each frame transmitted in which the message is of too low a priority to be sent.

The method is particularly applicable where a plurality of control messages are to be sent via a shared TDM/TDMA link. The various types of messages can be, for example, page requests, channel allocations, information/status requests, and a filling (idle) signal.

The present invention also relates to a TDM/TDMA transmitter including assignment means operative to assign priorities to control messages, and allocation means operative to assign the messages to TDM/TDMA time slots for transmission.

The node or transmitter can be a base station or a subscriber unit.

A preferred embodiment of the invention will now be described, by way of example, with reference to the drawings in which:

FIG. 1 is a schematic diagram illustrating the system including a base station (BTE-Base Terminating Equipment) and subscriber unit (NTE-Network Terminating Equipment);

FIG. 2 is a diagram illustrating frame structure and timing for a duplex link;

THE BASIC SYSTEM

Figure 4:
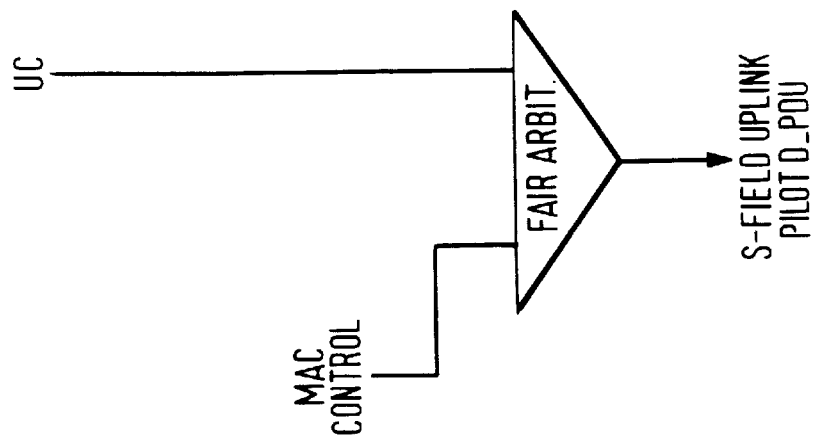
FIG. 4 is a schematic illustration of control message prioritisation in uplink pilot packets for transmission in respective time slots.

As shown in FIG. 1, the preferred system is part of a telephone system in which the local wired loop from exchange to subscriber has been replaced by a full duplex radio link between a fixed base station and fixed subscriber. The preferred system includes the duplex radio link, and transmitters and receivers for implementing the necessary protocol.

There are similarities between the preferred system and digital cellular mobile telephone systems such as GSM which are known in the art. This system uses a protocol based on a layered model, in particular the following layers: PHY (Physical), MAC (Medium Access Control), DLC (Data Link Control), NWK (Network).

One difference compared with GSM is that, in the preferred system, subscriber units are at fixed locations and there is no need for hand-off arrangements or other features relating to mobility. This means, for example, that in the preferred system directional antennae and mains electricity can be used.

Each base station in the preferred system provides six duplex radio links at twelve frequencies chosen from the overall frequency allocation, so as to minimize interference between base stations nearby. The frame structure and timing for the duplex link is illustrated in FIG. 2. Each duplex radio link comprises an up-link from a subscriber unit to a base station and, at a fixed frequency offset, a down-link from the base station to the subscriber unit. The down-links are TDM, and the up-links are TDMA. Modulation for all links is $\pi/4$ —DQPSK, and the basic frame structure for all links is ten slots per frame of 2560 bits. The bit rate is 512 kbps. Down-links are continuously transmitted and incorporate a broadcast channel for essential system information. When there is no user information to be transmitted, the down-link transmissions continue to use the basic frame and slot structure and contain a suitable fill pattern.

For both up-link and down-link transmissions, there are two types of slot: normal slots which are used after call set-up, and pilot slots used during call set-up.

Each down-link normal slot comprises 24 bits of synchronisation information followed by 24 bits designated S-field which includes an 8 bit header, followed by 160 bits designated D-field. This is followed by 24 bits of Forward Error Correction, and an 8 bit tail, followed by 12 bits of broadcast channel.

The broadcast channel consists of segments in each of the slots of a frame which together form the down-link common signalling channel which is transmitted by the base station, and contains the control messages containing link information such as slot lists, multi-frame and super-frame information, connectionless messages, and other information basic to the operation of the system.

The D-field may contain either I, or FAS channel data, and the S-field may contain either MS or SAS channel data. I denotes information data, which in the case of normal telephone use is digital speech but can also be other digital data such as fax/modem communications and ISDN data. MS, FAS and SAS are system control messages of which the MS messages tend to be for call set-up and control of MAC protocol. Slow associated signalling SAS tends to be used for in-call system control, and associated signalling FAS messages are sent for rapid call set-up when no information data I is yet being sent.

During call set-up, each down-link pilot slot contains frequency correction data and a training sequence for receiver initialisation, with only a short S-field and no D-field information.

Up-link slots basically contain two different types of data packet. The first type of packet, called a pilot packet, is used before a connection is set-up, for example, for an ALOHA call request and to allow adaptive time alignment. The other type of data packet, called a normal packet, is used when a call has been established and is a larger data packet, due to the use of adaptive time alignment.

Each up-link normal packet contains a data packet of 244 bits which is preceded and followed by a ramp of 4 bits duration. The ramps and the remaining bits left of the 256 bit slot provide a guard gap against interference from neighbouring slots due to timing errors. Each subscriber unit adjusts the timing of its slot transmissions to compensate for the time it takes signals to reach the base station. Each up-link normal data packet comprises 24 bits of synchronisation data followed by an S-field and D-field of the same number of bits as in each down-link normal slot.

Each up-link pilot slot contains a pilot data packet which is 196 bits long including 4 bit ramps defining an extended guard gap of 60 bits. This larger guard gap is necessary because there is no timing information available and without it propagation would cause neighbouring slots to interfere. The pilot packet comprises 64 bits of sync followed by 104 bits of S-field which starts with an 8 bit header and finishes with a 16 bit Cyclic Redundancy Check, 2 reserved bits, 14 FEC bits, and 8 tail bits. There is no D-field.

The S-field of an up-link pilot packet can contain a short information message, known as an up-link connectionless UC message. The S-field down-link can include a short information message of a so-called down-link connectionless DC message.

Provision is made in the preferred system for subscriber unit authentication using a challenge response protocol. General encryption is provided by combining the speech or data with a non-predictable sequence of cipher-bits produced by a key stream generator which is synchronised to the transmitted superframe number.

In addition, the transmitted signal is scrambled to remove dc components.

Multiplexing of Control Messages

Signalling messages from two or more sources which share a common communications channel are multiplexed by assigning priorities to the messages and transmitting in each frame the message which has the highest priority. Unsent messages can selectively have their priority incremented each frame until they are sent. In this way the available bandwidth is shared between the different message sources in some predetermined way, however all of the bandwidth is available to any one source if there is no traffic from the others.

This technique is used to multiplex MS signals (known as MAC Signalling) with data segments of higher layer frames i.e. SAS messages. The MS messages have a fixed priority depending on their type whereas SAS data segments have their priority incremented for each frame that they remain unsent. If neither MAC Signalling nor an SAS data segment is available then a fill message (MS-Idle ) is sent.

Prioritisation Scheme for MS and SAS Control Messages

Normal packets may carry either MS or SAS control messages.

The Prioritisation Scheme is designed to ensure that message sources are given fair shares of the available bandwidth. However, all of the bandwidth can be available to any one source if there is no traffic from the others.

The rules are as follows:

1. The multiplexer has 4 input queues, one for each category of MS message (each one message long) and one for SAS (one segment long).
2. MS messages are given a fixed priority.
3. SAS segments are given an initial priority value which is then incremented by 2 for each bearer for which it has been delayed.
4. The multiplexer transmits on each available bearer the message with the highest priority which may be transmitted on that bearer unless 16 consecutive segments have been transmitted on that bearer.
5. If 16 consecutive SAS segments have been sent on any bearer and there is no other MS message to send then the message MS-Idle-2 shall be sent on that bearer.

Priorities are assigned as shown in Table 1.

TABLE 1

| MA/SAS Priorities | |
|---|---|
| Bearer related | 8 |
| Connection related | 6 |
| MAC control | 4 |
| SAS segment | 1 (initial priority) |

Figure 3:
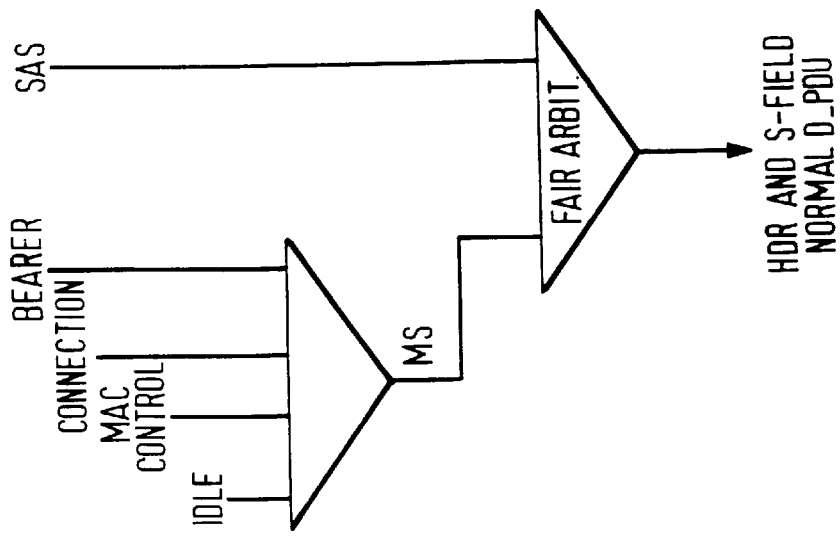
FIG. 3 is a schematic illustration of control message prioritisation in normal data packets for transmission in respective time slots.

The prioritisation of these different message types is illustrated schematically in FIG. 3.

Prioritisation Scheme for MS and UC Messages in Pilot Packets

Uplink Pilot packets sent in aloha slots may carry either MS system control messages or UC (so-called uplink connectionless) messages.

The Prioritisation Scheme is designed to ensure that message sources are given fair shares of the available bandwidth. However, all of the bandwidth can be available to any one source if there is no traffic from the others.

The rules are as follows:

1. The multiplexer has 2 input queues, one for MS and one for UC messages (each one message long).
2. MS messages are given a fixed priority;
3. UC messages are given an initial priority value which is then incremented by 2 whenever an MS message is passed to the Aloha protocol.
4. The multiplexer passes to the contention protocol the message with the highest priority.

Priorities are assigned as shown in Table 2:

TABLE 2

| MS/UC Priorities | |
|---|---|
| MAC control = MS message | 4 |
| UC message | 1 (initial priority) |

The prioritisation of these different message types is illustrated in FIG. 4. A subscriber unit (NTE) is able to access at least one aloha slot. Subscriber units may be able to access more than one aloha slot per frame provided the random access rules are obeyed.

Priorities Given to MS and DC Messages in the Broadcast Channel

Broadcast down-link MS signalling is multiplexed on the Broadcast channel with the down-link connectionless DC signals. In consequence, the Broadcast channel may contain addressed messages and/or system broadcast messages. For terminals operating in low duty cycle mode any addressed messages must be sent in the appropriate frame within the multiframe.

In the Broadcast channel, MS messages are labelled as follows:

| | |
|---|---|
| A | Page-Request |
| | Multi-bearer-Page-Request |
| B | Ch-Alloc |
| | Resource-Request-Ack |
| C | DC logical channel |
| D | Slot-List |
| E | System broadcast messages |
| | [Cipher-frame |
| | Carrier-Info] |
| F | MS-Idle-B |

Messages in categories A and C when used to address subscribers in Low Duty Cycle operation must be sent in the correct frame in the multiframe corresponding to the paging group of the base station. Messages in category B may be sent in any frame.

Only frames 0 through 7 may be used for paging groups for subscribers in Low Duty Cycle operation.

A subscriber in paging group M need only listen to frame M of each multiframe for messages in categories A and C.

The priority of the broadcast MS messages and of data on the DC channel is shown in Table 3.

TABLE 3

Broadcast Priority Table

| Frame number (in multiframe) | Message 1 Priority order | Message 2 Priority Order |
|---|---|---|
| 0–7 | $A_m$, $C_m$, A, B, C, D | $A_m$, $C_m$, A, D |
| 8–9 | A, D | D |
| 10–11 | A, B, C, D | A, D |
| 12–13 | A, D | D |
| 14 | A, B, C, F | A, F |
| 15 | E | — |

Notes

1. As they are 10 octets long the Ch-Alloc and Multi-bearer-Page-Request messages and DC logical channel messages can only appear as Message 1 and in frames where they are used there shall be no Message 2.
2. As they are 10 octets long the Ch-Alloc and Multi-bearer-Page-Request messages and the DC logical channel messages may not appear in frames 8,9,12 or 13 so as to guarantee the contents of the second message.
3. The slot list is guaranteed to appear in at least frames 8,9,12 and 13.
4. System broadcast information is guaranteed to appear at least in frame 15.

The message MS-Idle-B is used only when no other message is available. Messages in priorities A, B and D are addressed to subscriber units. Page-Request and the control messages when used to address subscriber units in the low duty cycle mode must be sent in the correct frame in the multiframe. Channel allocation (Ch-Alloc) may be sent in any frame.

Except for slot-list messages, when two MS messages are sent in a frame the second message does not repeat the first, for example, a Broadcast data unit may contain two Page-Request messages but only if these are addressed to different subscriber units.

MS messages are 5 octets of binary bits except Multi-bearer-Page-Request and Ch-Alloc messages which are 10 octets in length. DC messages are also 10 octets.

Only frames 0 through 7 of the 16 frame multiframe may be used for paging groups of subscriber units that are in low duty cycle operation. Low duty cycle operation allows a subscriber unit to remain in a state ready to receive a call, whilst conserving power.

We claim:

1. A method of transmitting control messages in time slots within fixed length time frames in which control messages are assigned priorities dependent on control message type according to a rule whereby each of a set of types of control messages has a predetermined corresponding priority, and the control messages are allocated to time slots dependent on their assigned priorities, each message having an assigned priority designated by a value and for selected message type(s), the associated priority values are incremented for each frame in which another higher priority message is sent.

2. A method of transmitting control messages in time slots within fixed length time frames in which control messages are assigned priorities dependent on control message type according to a rule whereby each of a set of types of control messages has a predetermined corresponding priority, and the control messages are allocated to time slots dependent on their assigned priorities, each message having an assigned priority designated by a value, and each control message being allocated to predetermined portions of at least one time slot and for those control messages transmitted from a subscriber unit to a base station after adaptive time alignment of transmissions between the subscriber unit and the base station, a call set-up control message (MS) is given a predetermined priority an in-call control message (SAS) is given a predetermined priority incremented for each frame for which the in-call control message (SAS) is unsent.

3. A method according to claim 2, in which MS messages include bearer related messages, connection related messages, and Medium Access Control (MAC) messages.

4. A method according to claim 3, in which a bearer related message is assigned a priority value of 8, a connection related message is assigned a priority value of 6, a Medium Access Control (MAC) is given a priority value of 4, and in-call control messages are given an initial priority value of 1.

5. A method according to claim 2, in which the priority value of an unsent in-call control message (SAS) is increment by 2 every frame.

6. A method of transmitting control messages in time slots within fixed length time frames in which control messages are assigned priorities dependent on control message type according to a rule whereby each of a set of types of control messages has a predetermined corresponding priority, and the control messages are allocated to time slots dependent on their assigned priorities, each message having an assigned priority designated by a value, and each control message being allocated to predetermined portions of at least one time slot and for those control messages transmitted from a subscriber unit to a base station before adaptive time alignment of transmissions between the subscriber unit and the base station, include a call set up control message (MS) and a data message (UC).

7. A method of transmitting control messages according to claim 1, in which frames are grouped into a repeating sequence of frames, messages having priorities dependent on which frame of the repeating sequence of frames is currently being processed.

8. A method according to claim 7, in which control messages are sent from base station to subscriber unit, a selected type of message being sent only in selected frames of the repeating sequence of frames.

9. A method according to claim 7, in which paging messages are only sent in frames of the repeating sequence frames for which the subscriber unit is expecting a possible paging message.

10. A method according to claim 9, in which paging messages are sent in any of frames 0 to 7 of a sixteen frame repeating sequence.

11. A method according to claim 9, in which paging messages are only expected by a subscriber unit in low duty cycle mode.

12. A method of transmitting control messages according to claim 7, in which aloha slot messages are only transmitted in selected frames of the repeated sequence.

13. A method of transmitting control messages according to claim 1, in which transmissions are by radio.

* * * * *